Aug. 24, 1943.   W. E. FISHER ET AL   2,327,779
SEPARATION OF MIXTURES CONTAINING SOLVENTS
Filed Nov. 10, 1939
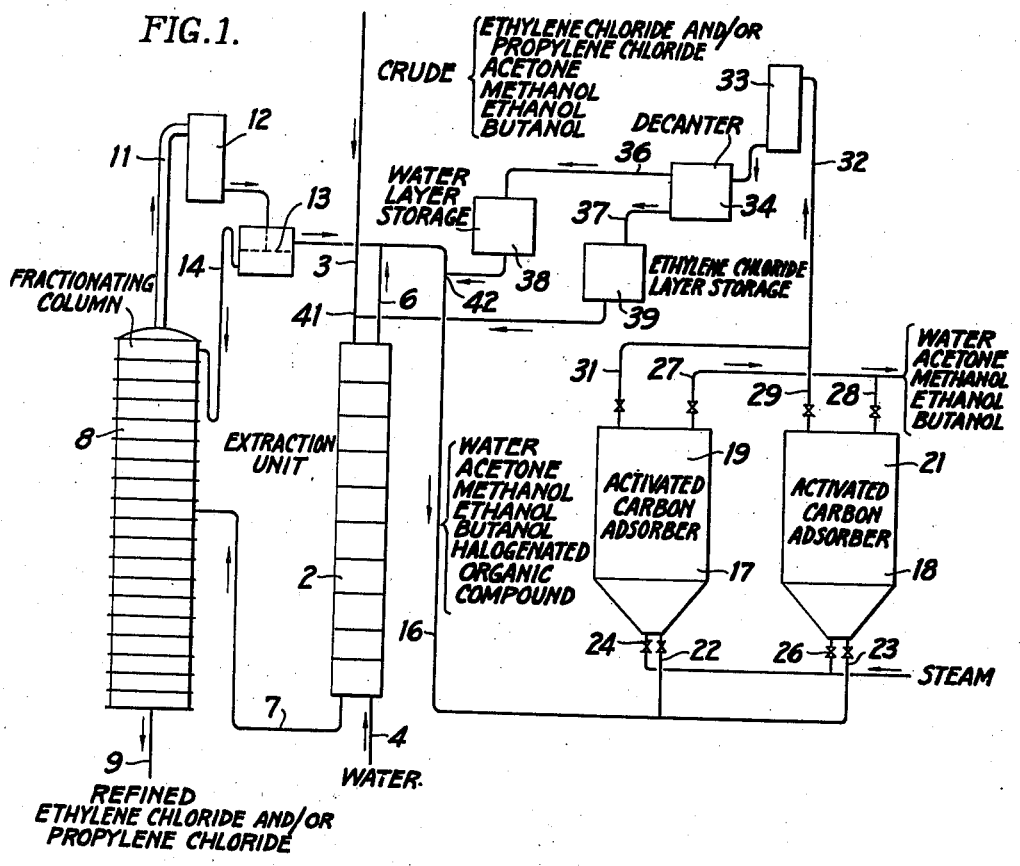
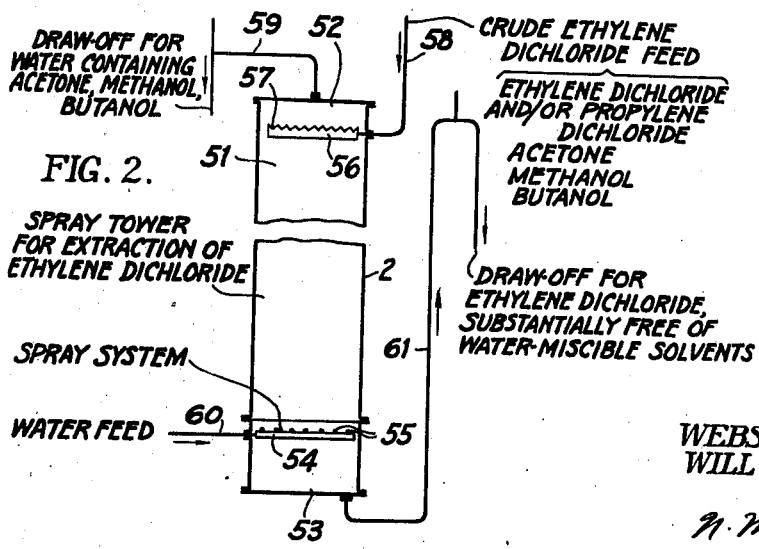
WEBSTER E. FISHER
WILL H. SHEARON, JR.
INVENTORS
ATTORNEYS Patented Aug. 24, 1943

2,327,779

UNITED STATES PATENT OFFICE 2,327,779

SEPARATION OF MIXTURES CONTAINING SOLVENTS

Webster E. Fisher, Rochester, N. Y., and Will H. Shearon, Jr., Nashville, Tenn., assignors to Eastman Kodak Company, Rochester, N. Y., a corporation of New Jersey Application November 10, 1939, Serial No. 303,924

6 Claims. (Cl. 210—62)

This invention relates to a process of separating mixtures containing water-miscible and water-immiscible solvents. More particularly, this invention relates to a separation of mixtures containing components such as halogenated hydrocarbons in the presence of alcohols, ketones and water.

In certain industrial processes, mixtures containing both water-miscible and water-immiscible components are obtained as a by-product and it is desirable to separate the components of the mixture at least to some extent in order that they may be reused. For example, mixtures containing halogenated hydrocarbons such as ethylene chloride and/or propylene chloride, alcohols such as methyl alcohol, ethyl alcohol, butyl alcohol, etc., and ketones such as acetone, are obtained industrially. In order to render such materials in suitable condition for reuse, it is desirable that the components be separated in a relatively uncontaminated condition.

The separation of such mixtures by ordinary distillation is impossible, since the halogenated hydrocarbons, for example, form constant boiling mixtures with certain of the alcohols. Or, it may be that ternary constant boiling mixtures will be formed between the water, alcohols and the halogenated hydrocarbons.

Methods of separation heretofore proposed have been rather complicated in some respects and some of the components obtained still remain contaminated with the halogenated hydrocarbon.

We have found a method for separating various mixtures of solvents containing halogenated hydrocarbons, alcohols, ketones, water and the like, wherein the components may be obtained in a relatively uncontaminated condition.

This invention has for one object to provide a method for the separation of mixtures containing both water-miscible and water-immiscible solvents. Another object is to provide a method for separating mixtures containing lower aliphatic alcohols in the presence of halogenated hydrocarbons to obtain the alcohol components at least substantially uncontaminated with the halogenated hydrocarbons. Still another object is to provide a method of separating mixtures containing halogenated hydrocarbons, alcohols, ketones and water by procedure wherein the inter-formation of azeotropes is minimized. Still another object is to provide a continuous process for the separation of mixtures containing halogenated hydrocarbons, alcohols, ketones and the like. Still another object is to provide an apparatus arrangement particularly adapted for carrying out our process. Other objects will appear hereinafter.

We have found that by combining countercurrent extraction with a particular type of activated carbon adsorption treatment, a very economical and efficient method for recovering water-miscible and water-immiscible solvents is obtained.

For a further understanding of our invention, reference is made to the attached drawing forming a part of the present application.

Fig. 1 is a semi-diagrammatic side elevation view showing one arrangement of apparatus which may be employed for carrying out our invention.

Fig. 2 is a detail view showing preferred construction of our extraction unit.

Referring to Fig. 1, 2 represents an extraction unit which may be of various types but preferably is of the construction described in detail under Fig. 2.

This unit is provided with inlet conduits 3 for the materials to be treated and 4 for the extractant. Suitable withdrawal conduits are provided at 6 and 7.

Conduit 7 is preferably connected to the intermediate section of a fractionating column 8 which may be of any usual construction. It is to be understood that it will include bubble plates, sieves or other mechanism in its construction for promoting fractionation, heating means and the like. A draw-off conduit 9 is provided at the base of the column.

The upper portion of the column is provided with vapor offtake conduit 11 which leads through condenser 12 to decanter 13. The decanter is connected by conduit 14 to the column and by conduit 16 to the several adsorbers 17 and 18.

These adsorbers may be of a variety of constructions and would comprise containers such as cylindrical tanks 19 and 21 adapted to contain activated charcoal. Screens or other suitable means (not shown) may be provided in the tanks for supporting the contents. Valved feed lines 22 and 23 would be connected with conduit 16 aforementioned. Other valved conduits 24 and 26 could be provided leading into either the upper or lower part of the apparatus for the introduction of cleaning medium. The adsorbers are also provided with a plurality of valved conduits 27, 28, 29, 31. The first-mentioned conduits may lead to storage tanks, distillation columns, or the like, and the last-mentioned conduits 29 and 31 connect with conduit 32 and lead through condenser 33 to decanter 34. The discharge lines 36 and 37 from decanter 34 pass through storage vessels 38 and 39 and join the previously described conduits 3 and 16 at points 41 and 42.

Referring to Fig. 2, we have shown in large scale, construction of a novel unit such as may be employed for extractor 2 in Fig. 1. While as indicated in Fig. 1 the apparatus will function with packed towers, towers using stirring units, and the like, we have found that considerably better operation can be obtained by using the construction of Fig. 2. This unit comprises elongated enclosed shell 51 provided with a head 52 and a base 53. The lower portion of the unit is provided with a spray system 54 which may include an elongated, annular, cross-shaped or other shaped element 54 provided with a plurality of small nozzles 55. The upper portion of the unit is provided with a disperser 56 which may comprise an annular trough having saw-toothed edges 57 at the top. In place of the saw-toothed construction various other constructions could be employed, provided such modified construction would function to break up a continuous phase flow into a number of small streams. Or, if desired, sprays may be employed in both extremities of the unit.

The apparatus of Fig. 2 is provided with a plurality of conduits 58, 59, 60 and 61 which perform comparable functions to conduits 3, 6, 4, and 7 described.

The functioning of our apparatus, as well as the operation of our novel process will be apparent from the following example:

In accordance with this example, it was desired to separate a mixture containing ethylene chloride, acetone, methyl, ethyl and butyl alcohols, in the presence of water. As already pointed out, such a mixture may not be separated by straight distillation due to the formation of various azeotropes, as for example azeotropes between ethylene chloride-methyl alcohol and ethylene chloride-ethyl alcohol or ternary azeotropes of these components with water. We have found, however, that the mixture may be separated by the following procedure. Referring to Fig. 1, the aforementioned mixture was conducted through conduit 3 into the extraction unit 2.

For reasons which will be pointed out in detail hereinafter, it is preferred that the extractor unit 2 comprise a construction shown in Fig. 2. Suitable solvent for the alcohols and ketone component such as water is supplied to the unit through conduit 4. The alcohols (methyl alcohol, ethyl alcohol, butyl alcohol) and ketones are readily extracted into the water and flow from the apparatus through conduit 6. The halogenated hydrocarbon in this example, namely, the ethylene chloride being insoluble in water, and having been extracted substantially free of alcohols and ketones, flows through conduit 7 into the fractionating column 8.

In fractionating column 8 the ethylene chloride is subjected to distillation wherein any small amounts of water, alcohols and ketones, together with some of the ethylene chloride, distill off through conduit 11 and are condensed in condenser 12 and decanted in decanter 13. By this procedure refined halogenated hydrocarbon, ethylene chloride in this example, may be withdrawn from the base of the column through conduit 9. The halogenated hydrocarbon may be withdrawn either as a vapor or liquid.

The condensate in the decanter 13 settles into layers. The upper layer drawn off through conduit 16 is comprised of water, together with small amounts of the aforementioned alcohols and ketones. The lower layer withdrawn through conduit 14, comprises ethylene chloride which furnishes reflux to the column 8.

The aqueous alcoholic liquid flowing through 16 is supplemented by the aqueous liquid also containing alcohols and ketones, passing out of the extraction unit through conduit 6. This aqueous alcoholic solution contains small quantities of the ethylene dichloride due to the fact that although ethylene chloride and water are substantially insoluble, since the ethylene chloride is soluble in the alcohols, some ethylene chloride is carried into the aqueous solution when the alcohols are extracted with the water.

However, any content of halogenated hydrocarbon in the alcohol and ketone solution is readily removed by passing the solution through units such as 17 or 18 filled with activated charcoal. The alcohol or ketone or mixture thereof issuing either through conduits 27 or 28, is substantially freed of any halogenated hydrocarbon. The alcohols and ketones may be passed to ordinary distillation and separated into the individual constituent desired. Or, the alcohols and ketones freed of halogenated organic compounds may be passed to storage or other treatment.

When one of the adsorbers 17 or 18 becomes saturated with the halogenated organic compound, to such an extent that it no longer substantially completely removes the halogenated organic compounds from the alcohol and/or ketone solutions passing therethrough, by means of the valved arrangement shown the saturated adsorber may be cut out of the system and the liquids passed through the other adsorber.

The saturated adsorber which has been cut out of the system in this example, which will be assumed to be adsorber 17, preferably is drained and then steamed by live steam introduced through conduit 24. During this steaming, the valve in conduit 31 would be open and the ethylene chloride adsorbed in the activated carbon is removed therefrom and the carbon reactivated. The ethylene chloride so removed passes through conduit 32, is condensed in condenser 33 and flows into decanter 34 where any water is permitted to separate therefrom. The water layer from this separation is passed through parts 36 and 38 into the system at point 42. The ethylene chloride layer from the separation is passed through parts 37, 39 into the system at point 41.

By alternate use of the adsorbers as described, our process may be run continuously for long periods of time.

Our process results in considerable saving in steam and equipment and permits the substantially complete removal of halogenated organic compounds from aqueous alcohol and/or ketone solutions.

Referring to Fig. 2, we have found that if our extraction step is carried out by procedure wherein the extraction medium is sprayed into the distributed mixture to be extracted, considerably more efficient results can be obtained than by using conventional extraction apparatus. That is, our novel spray method of extracting the water-miscible constituents from the halogenated organic compounds such as ethylene dichloride possesses several advantages over packed or stirred towers. We have found that by our novel construction, of approximately one-third of a conventional extraction column the same diameter, a product of equal quality is obtained. In addition to obtaining large extracting surface by means of our construction of Fig. 2, we have found that there is little, if any difficulty experienced in the parts becoming out of order, clogged or otherwise functioning improperly. In addition, the cost of construction of our novel unit is considerably less than that of, for example, a stirred tower designed to handle the same amounts of material.

Our process as described in the above example has been applied to the recovery of solvent mixtures containing the halogenated hydrocarbon, ethylene chloride, lower aliphatic alcohols and acetone. However, our invention is applicable to other mixtures which comprise water-immiscible solvents and water-miscible solvents. Examples of water-immiscible solvents would include chlorinated hydrocarbons in general, such as ethylene chloride, propylene chloride, trichloroethylene, carbon tetrachloride or tetrachloroethane, straight chain hydrocarbon such as hexane, heptane, octane, or unsaturated hydrocarbons, cyclic hydrocarbons such as benzene, toluene or xylene, esters such as ethyl acetate, propyl acetate, butyl acetate, amyl acetate or iso-amyl acetate. Examples of water-miscible or partly miscible solvents include ketones such as acetone, methyl ethyl ketone, alcohols such as methyl ethyl, propyl and butyl alcohols. It may at times be desirable to employ our process of recovery even when no azeotropes occur as in the example given, where acetone itself could be separated by fractional distillation but where other components such as the alcohols would make it necessary to use our process even though the acetone could be removed first by fractional distillation.

It is apparent from the foregoing that our invention is susceptible to some modification; hence, we do not wish to be restricted excepting insofar as may be necessitated by the prior art and the spirit of the appended claims.

What we claim and desire to be secured by Letters Patent of the United States is:

1. In a process for the separation of liquid mixtures containing water-soluble components of lower aliphatic alcohols, ketones, and water-insoluble hydrocarbon components by procedure including both distillation and water extraction, the steps which comprise conducting aqueous layers resulting in the process containing at least part of the aforesaid alcohols and ketones and some of the hydrocarbon components, the components being in a different ratio than in the initial mixture, in a liquid condition, into contact with activated carbon, whereby the hydrocarbon component is taken up and water and water-soluble components pass on, and periodically during the operation of the process passing steam through the carbon containing the hydrocarbon which has been taken up for removing the same from the carbon.

2. In a process for the separation of mixtures containing methanol, acetone and at least one substantially water-insoluble component, by procedure including the steps of distillation and extraction, the improvement steps which comprise conducting aqueous liquids resulting from the aforesaid steps containing at least a part of the methanol and some of said hydrocarbon in a liquid condition, into contact with activated carbon, whereby the hydrocarbon component is taken up and the aqueous methanol and acetone passes on periodically during said operation, passing steam through the activated carbon containing the adsorbed water-insoluble hydrocarbon for removing same therefrom, and conducting to further processing the hydrocarbon component which has been so removed.

3. A process for the separation of mixtures containing substantial amounts of halogenated hydrocarbons, alcohols, ketones, and water, which comprises spraying water into the dispersed mixtures to dissolve the alcohol and ketone components thereof, separating the aqueous halogenated hydrocarbon component from the alcohol and ketone solution still containing small amounts of halogenated hydrocarbon, subjecting the aqueous halogenated hydrocarbon content from the separation to distillation for volatilizing any small amount of alcohols, ketones, and water therein, condensing the alcohols and ketones separated in this distillation and passing the condensed alcohols and ketones together with the alcohols and ketones from the first separation and still containing small amounts of halogenated hydrocarbon, into contact with activated carbon for adsorbing said small amounts of halogenated hydrocarbon, periodically during the operation of the process passing steam through the activated carbon containing adsorbed halogenated hydrocarbon for removing the same from the carbon, condensing the halogenated hydrocarbon removed by the steam, and returning the aqueous halogenated hydrocarbon to the step wherein the original mixture of halogenated hydrocarbons, alcohols, ketones and water is sprayed with water.

4. A process for the separation of mixtures containing substantial amounts of halogenated hydrocarbons, alcohols, ketones and water, which comprises: (1) extracting and separating the major proportion of the alcohol and ketone components including minor quantities of halogenated hydrocarbons from the mixture with a flow of additional water, (2) subjecting the remaining part of the mixture which now contains a major proportion of halogenated hydrocarbons and a minor proportion of alcohols, ketones and water to distillation to separate said minor proportion of alcohols, ketones and water, (3) withdrawing the residual refined halogenated hydrocarbons from this distillation, (4) collecting said major and minor proportions of alcohol, ketones, water which contain said minor quantities of halogenated hydrocarbons and passing this mixture through activated carbon to filter out the minor quantity of halogenated hydrocarbons, (5) removing the thus purified alcohol, ketone, water mixture from the system, (6) periodically during the operation of the process passing steam through the activated carbon containing the adsorbed halogenated hydrocarbon for removing the same from the carbon, (7) condensing the halogenated hydrocarbon removed by the steam, (8) and returning this aqueous halogenated hydrocarbon mixture to the first extraction step wherein the original mixture of halogenated hydrocarbons, ketones and water is treated with water.

5. The process of claim 3 wherein the mixture being separated contains ethylene chloride, methanol, ethanol, acetone and water.

6. The process of claim 3 wherein the mixture being separated contains ethylene chloride, propylene chloride, acetone, and an alcohol having the formula $C_nH_{2n+1}OH$ wherein $n$ is a small whole number less than 5.

WEBSTER E. FISHER.
WILL H. SHEARON, Jr.